United States Patent [19]

Baisley et al.

[11] Patent Number: 5,978,586
[45] Date of Patent: Nov. 2, 1999

[54] METHOD FOR TRACKING CHANGES IN SOURCE LOCATIONS IN A COMPILER

[75] Inventors: Donald Edward Baisley, Laguna Hills; Jonathan Virgil Ziebell, Trabuco Canyon, both of Calif.

[73] Assignee: Unisys Corp., Bluebell, Pa.

[21] Appl. No.: 08/978,706

[22] Filed: Nov. 26, 1997

[51] Int. Cl.⁶ .................................................. G06F 9/45
[52] U.S. Cl. ......................... 395/705; 395/704; 395/708
[58] Field of Search .................................... 395/704, 705, 395/707, 708

[56] References Cited

U.S. PATENT DOCUMENTS

| | | | |
|---|---|---|---|
| 5,339,431 | 8/1994 | Rupp et al. | 395/710 |
| 5,371,747 | 12/1994 | Brooks et al. | 364/267.91 |
| 5,555,419 | 9/1996 | Arsenault | 395/704 |
| 5,560,015 | 9/1996 | Onodera | 395/708 |
| 5,673,390 | 9/1997 | Mueller | 708/104 |
| 5,701,487 | 12/1997 | Arbouzov | 395/704 |
| 5,713,010 | 1/1998 | Buzbee et al. | 345/507 |
| 5,812,850 | 9/1998 | Wimble | 395/704 |
| 5,822,592 | 10/1998 | Zhu | 395/705 |

OTHER PUBLICATIONS

"Efficient Method for Implementing Pre–Compiled Headers for C and C++"; IBM Technical Disclosure Bulletin; vol. 39, No. 4, pp. 165–170, Apr. 1996.

"Object–Oriented Assembler/Disassembler"; IBM Technical Disclosure Bulletin; vol. 38, No. 7, pp. 495–496, Jul. 1995.

Buksbaum, D.; "An Object–Oriented ATLAS Compiler"; Conference Proceeding of IEEE Systems Readiness Technology Conference, AUTOTESTCON '94; pp. 257–261, Sep. 1994.

Cooper, K.; Hall, M.; Torczon, L.; "Unexpected Side Effects of Inline Substitution: A Case Study"; ACM Letters on Programming Languages and Systems; vol. 1, No. 1, pp. 22–32, Mar. 1992.

"Method to Correlate Error Report to Source Code"; IBM Technical Disclosure Bulletin; vol. 29, No. 12, p. 5315, May 1987.

*Primary Examiner*—Tariq R. Hafiz
*Assistant Examiner*—Brian Sattizahn
*Attorney, Agent, or Firm*—J. Ronald Richebourg; Mark T. Starr; Steven B. Samuels

[57] ABSTRACT

The disclosed method creates a source object for each source language element parsed by the compiler and associates each such created source object with objects created from source language elements to produce source-mapped objects. Next, the source-mapped objects are transformed into corresponding machine-instruction objects and a binary file of the machine-instruction objects is created by: i) adjusting a source data object to a source object associated with a machine instruction object, thereby identifying a lowest level of inlining where the call history of the source object differs from the call history of the previous source object to which the source data object was adjusted; ii) if the source data object identifies no differences from the previous source object, then continuing at step i) for the next machine instruction; and, iii) for each level of the call history beginning with the level returned in the preceding step and continuing through the last level, putting information obtained from the source data object in a source table stored in the binary file.

6 Claims, 9 Drawing Sheets

METHOD FOR TRACKING CHANGES IN SOURCE LOCATIONS IN A COMPILER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of compiling source programs into binary programs for execution on computing systems, and more particularly to a method and apparatus for tracking changes in source locations in a compiler.

BACKGROUND OF THE INVENTION

A compiler is a computer program that reads source files of another program to produce a binary file, which is required for execution by a computer. The source files describe the program using a computer language such as C, C++, COBOL or the like. The binary file produced by the compiler contains a series of binary machine instructions for a particular type of computer. Moreover, the compiler generates diagnostic messages when it detects errors in the source files. A compiler is distinguished from an assembler by the fact that each input statement does not, in general, correspond to a single machine instruction or fixed sequence of instructions. A compiler may support such features as automatic allocation of variables, arbitrary arithmetic expressions, control structures such as FOR and WHILE loops, variable scope, input/output operations, higher-order functions and portability of source code.

A source file can contain compiler directives that cause other source files to be included. A compilation unit is a single source program file given to the compiler, plus all the source program files included directly or indirectly by that file. A binary file can contain machine instructions from one or more compilation units, and a compilation unit can come from multiple source files. Sometimes the machine instructions of a single compilation unit are saved in a separate binary file, called an object file. Object files are then combined by a linker to create a final binary file.

A compiler that has been programmed with the use of objects must relate its objects (representing a program being compiled) to locations within the source files. The parsing phase of compilation creates objects representing program elements, such as functions, statements and expressions. The code generation phase of compilation involves generating machine instruction objects for the program element objects. Locations in the source files must be captured and maintained for the program element objects and then passed on to the respective machine instruction objects. A source location usually consists of a source file name and a line number within the source file.

The compiler uses the source locations of its objects in at least two cases. First, the compiler shows a source location when issuing a diagnostic message to inform the compiler's user of an error location. Secondly, the compiler places a table in the binary file with the machine instructions mapping the instructions to their corresponding source locations. This table is used for debugging when the machine instructions are loaded from the binary file into a computer system's memory and executed. If processing of the machine instructions is interrupted, a debugger or other diagnostic software can use the table to find the source location that corresponds with the current point of execution of machine instructions. If call instructions are used, the debugger or other diagnostic software can also use the table to find the source locations of the series of calls that arrived at the interrupted machine instruction. The list of source locations, starting with the point of interruption followed by the source locations of the calls that arrived there in order of the most recent call to first call, is referred to as a call history.

One type of prior art compiler processed a source file in a single pass by reading the source file and generating machine instructions at the same time. Typically included in this type of one-pass compiler are running variables holding the current source file name and line number, which are used to correlate between the original source file and the generated binary code. Such a straightforward correlation is adequate for a one-pass compiler but is too simplistic to cover most compiler requirements of today.

Many compilers today scan source files to create objects representing program elements. The compiler then makes multiple passes over the objects in order to verify correctness, find optimization opportunities and generate machine instructions. Some compilers then make one or more additional passes over the machine instructions to find still more optimization opportunities. Optimizations cause objects to be sometimes moved in their respective order and sometimes replaced by other new objects. These relocations and replacements happen to both program element objects and machine instruction objects. The prior art for relating machine instructions to source locations in typical multipass compilers uses two instance variables in each object. The first variable points at a source file name using either a memory address or an index into a table of names. The second variable holds a line number within the named file. These two variables, which must be set as objects, are created while scanning source files and then copied to other objects created in later passes, such as for optimization and code generation. In some compilers the two variables are combined into one variable that holds an index into a list of ranges of line numbers with source files.

A common and important optimization called "inlining" causes a major problem with the way source locations are managed by the prior art compilers. The term "inlining" as used herein shall mean the replacing of a function with an instance of the function's body. When a compiled program is interrupted, the locations of call instructions are used to look up source locations to build a complete call history. Inlining causes call instructions to be removed. A compiler copies the objects representing the body of an inlined function in place of a call on the function. Using the method of the prior art, each copied object can be related to only one source location. So the compiler can preserve either the location of the call or the location within the inlined function, but not both. The result is that a call history reported by a debugger or other diagnostic software is incomplete. Gaps in the call history resulting from inlining cause confusion and create misleading results.

If a compiler can track partial call histories as well as source locations for its objects, then there needs to be a way for a compiler to extract details. As the compiler goes through the sequences of machine instruction objects in order to put machine instruction codes into the binary file, it must identify changes in source location details and indicate those changes in a table also put in the binary file. When call histories change, they are likely to change more quickly at deeper levels of inlining and less frequently at shallow levels. If at each change in a call history the entire new histories are put in the table, the table is made much larger than it needs to be. An apparatus that detects not only change, but the level of change within call histories can reduce the size of the generated table.

SUMMARY OF THE INVENTION

The present invention is an object-oriented method and apparatus in a compiler program running on a computer for compiling source files into a binary code file for execution on a target computer. This method and apparatus is disposed for tracking changes to source locations associated with machine instruction codes put into the binary code file. The apparatus comprises a first type of object that uses an integer to relate a machine instruction object to a specific source location, and where inlining has occurred, to a list of source locations forming a call history. A second type of object is included that provides source location details for objects of the first type presented in sequence while tracking corresponding changes in details. The details include the source file name of a source location; the source line number within a source file of a source location; and, where inlining has occurred, a sequence of pairs of former for each level of inlining.

The method of the present invention includes the steps of creating a source object for each source language element parsed by the compiler and associating each such created source object with objects created from source language elements to produce source-mapped objects. Next, the source-mapped objects are transformed into a corresponding machine-instruction object and a binary file of the machine-instruction objects is created by: i) adjusting a source data object to a source object associated with a machine instruction object; ii) for each level returned in the preceding step greater than or equal to zero, putting information obtained from the source data object in a source table stored in the binary file, starting at level returned and ending with last level; and, iii) repeating steps i) and ii) for all machine instruction objects.

A feature of the present invention resides in the use of object-oriented programming to represent source file locations that become part of all objects representing programming elements and machine instructions.

Another feature of the present invention resides in the capability of supporting complete call histories, even when inlining.

An advantage of the present invention resides in the encapsulation of source location management in objects that can be readily adapted for use in any compiler using objects. This encapsulation simplifies the complexities of dealing with call histories where inlining has occurred.

Another advantage of the present invention resides in the capability of storing only differences between consecutive inlined call histories thereby minimizing the size of the table of source locations and the amount of data required to be stored in the binary file.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

DETAILED DESCRIPTION OF ONE EMBODIMENT

Figure 1:
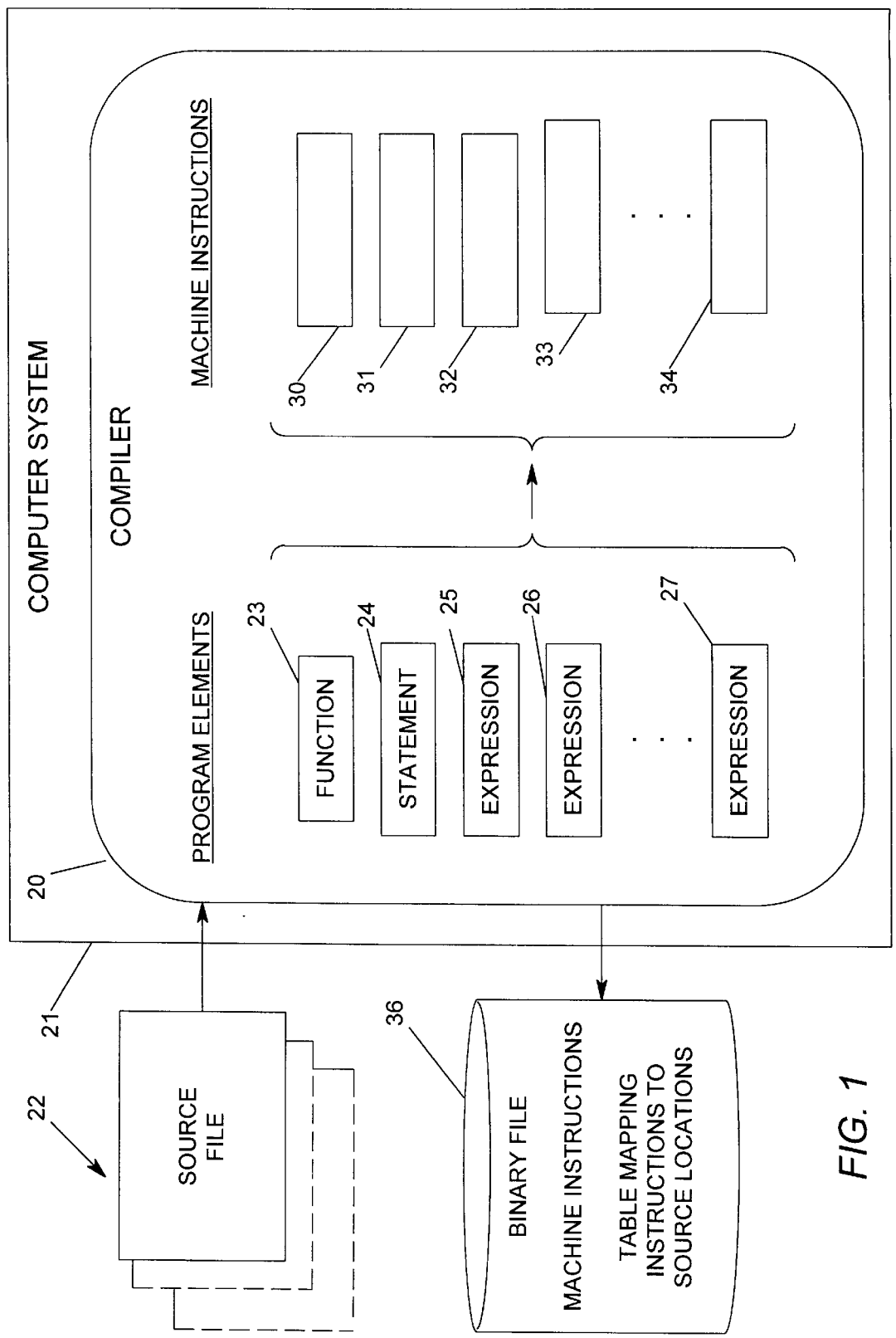
FIG. 1 is a block diagram illustrating the flow of information through a compiler running in a computer system, from source files to objects for program elements, and then to objects representing machine instructions, and finally, to a binary file.

A background of object oriented programming concepts and related definitions are set forth hereinbelow.

Object-oriented programming is defined as a method of implementation in which programs are organized as cooperative collections of objects, each of which represents an instance of some type. See a text entitled *Object-Oriented Analysis and Design*, by Grady Booch, 1994.

An object is an abstract representation of a real-world concept or thing—such as a person, a software package, or an event. In a computer system memory, the state of an object is represented by the values of instance variables defined for the object's type. For example, the state of a person object might be a name, birth date, spouse, etc.

The behavior of an object is the set of operations that the object can perform. In the computer system, the behavior of an object is represented by the operations defined for the object's type.

Objects in the memory of a computer system represent real-world or conceptual entities. An object occupies a portion of memory which contains named instance variables for storing information about the entity. An object also provides operations that can be performed by the computer processor for accessing and modifying the information.

Types

A type is a template that describes the instance variables and operations that an object possesses. A type defines a pattern that can be used to create or identify objects; it does not contain the actual object. A type can also be a base for other types.

Objects described by a type are called instances of that type. Types derived from a base type are called subtypes of that type. A type that is used to define only other types and not objects is said to be abstract.

The definition of a subtype identifies the base types from which it is derived. A type cannot be a subtype of itself. A subtype inherits all the instance variables and operations of its base types. It can be customized by adding new instance variables and operations. For example, a type called Manager defined as a subtype of Employee would inherit all the instance variables and operations of Employee and would define additional instance variables and operations of its own. An object of type Manager would then have all the instance variables defined by the Employee and Manager types, and would have all the operations defined by both types.

Instance Variables

The memory used by an object contains instance variables. Each instance variable has a type, which defines the range of values that can be stored in the variable.

Operations

An operation is a feature that represents a behavior that objects possess. The operations defined for a type form an interface that can be seen by users of objects of that type. An operation can have parameters that identify information a caller must provide when invoking the operation. If an operation has no parameters, a caller merely invokes the operation for the desired object.

Methods

Each operation must be implemented by a module of code called a method. A method is the steps performed to complete an operation.

Referring now to FIG. 1 a block diagram illustrates the flow of information through a compiler 20 running in a computer system 21. One or more source files 22 are provided as an input to the compiler 20 whereupon they are parsed to generate objects 23 through 27 for program elements. The objects 23–27 are then converted by the compiler to objects 30 through 34, which represent machine instructions. The machine instructions are then stored in a binary file 36. In accordance with the present invention, the binary file 36 includes table mapping instructions to source locations.

The compiler 20, which has been programmed using objects, must relate its objects (representing a program being compiled) to locations within the source files 22. The parsing phase of compilation creates objects representing program elements, such as functions 23, statements 24 and expressions 25–27. A source location of one of these objects is generally shown as a source file name and a line number within the named source file. The code generation phase of compilation involves generating machine instruction objects for the program element objects. The source location of a machine instruction object is generally the same as the source location of the statement or expression for which the machine instruction was generated.

The compiler 20 uses the source locations of its objects in at least two cases. First, the compiler shows a source location when issuing a diagnostic message to inform the compiler's user of an error location. Secondly, the compiler puts a table in the binary file along with the machine instructions in order to map the instructions to their corresponding source locations. This table is used for debugging when the machine instructions are loaded from the binary file into a computer system's memory and executed. When processing is interrupted, a debugger or other diagnostic software can use the table to find the source location or inlined partial call history that relates to the current point of execution of machine instructions and can find the same information for each call instruction in the series of calls that arrived at the interrupted instruction in order to show a complete call history.

For a compiler to use this invention, it must include and use two types. The types are Src (a source location or inlined call history) and SrcData (source location details about an Src object). These types are amplified hereinbelow and comprise the entire interface to the invention by a compiler. Other types, also described below, are used internally within the invention.

A compiler uses the two types alluded to hereinabove at various stages of compilation as follows. First, source files and their ranges of line numbers are registered for the Src type. Then, as each language element is parsed, an Src object is created for its source location. Compiler objects, such as those for declarations, statements, expressions, and so on, must have an instance variable of type Src by which they are related to their respective source locations. Whenever one of these objects is created, it must pick up the Src. During processing of each compiler object, if new objects are to be created to replace or augment the object, it is necessary to propagate the original Src into the new objects.

If functions are inlined by the compiler, then objects copied from a function being inlined into the place of a call on the function use a special construction of Src which combines the Src of the call and the Src of the object being copied. The copied object then has an Src representing an inlined call history. Note that either or both of the two Src objects used by the construction can already be inlined call histories. As machine instruction objects are generated for each compiler object, such as a statement or expression, the compiler object's Src must be copied into each machine instruction object. Finally, as the compiler goes through the sequence of machine instruction objects in order to put machine instruction codes into the binary file, it uses an SrcData object to identify changes in source location details in order to indicate those changes in a table also stored in the binary file. The SrcData object indicates when call histories change and the level at which they change and only these changes need to be stored in the table.

Where inlining has occurred, source locations tend to change most frequently at the deepest levels of inlining, and less frequently at the outer levels. In other words, the source location of an inlined call remains the same through changes in the source locations of statements in the inlined function. To minimize the size of the table, the source location of the call can be stored just once, even though it is part of many call histories. This can be accomplished by organizing the table hierarchically by levels of inlining. Accordingly, the compiler is able to keep the table size to a minimum while providing all the information needed for debugging tools to show complete call histories.

The following types are defined by the apparatus and method of the present invention:

1. An object type, Src, identifies a source location, and where inlining has occurred, a list of inlined source locations. Src objects are small so they can be present in the many objects used within a compiler without a substantial overhead in memory usage. An object of type Src has one instance variable, an integer. The Src type supports the following operations:

a. construction of a null Src;

b. construction of an Src from an integer offset into the source lines of a compilation unit;

c. construction of an Src as a copy of another Src;

d. construction of an inlined Src from a first Src being inlined at a second Src, either of which can also represent inlined source locations such that inlining can occur in any order and to any depth;

e. an operation to establish a base offset for a compilation unit. The operation must be called when starting to construct Src objects for a new compilation unit or when changing to a previous compilation unit. The operation takes one optional argument, which if given, must be a base previously returned by a call on this same operation. Otherwise, a new base is established. The operation returns the base offset; and, f. an operation to define a range of integer offsets into the source lines of a compilation unit belonging to a single source file. The arguments for this operation are (1) a source file name, (2) a first line number within the source file of this range, (3) the starting offset of the range within the source lines of the compilation unit from the base established by the last call to e above, and (4) the ending offset of the range. This operation must be called in order of ascending ranges with no overlapping ranges.

2. An object type, SrcData, provides details about an Src object. The Src object can be given at construction or through an operation that adjusts the details to reflect the new Src object. An Src object can identify source locations for multiple levels of inlining. Likewise, an SrcData object can provide details for each level of inlining identified by an Src object.

An object of type SrcData contains seven instance variables. The first two, called myData and myNewData, have type pointer-to-LvlData. The third, called mySrc, has type Src. The fourth instance variable, called myRange, has type pointer-to-SrcRange. The last three, called myLvl, myLastLvl and myNewLastLvl, have type integer.

a. myData and myNewData point to dynamically allocated arrays of LvlData. The object type LvlData contains the details of an Src object. The details include the line number, the inlined function identifier (if any), the object file name, and the source file name. Two arrays of LvlData are required to adjust an SrcData object from one Src object to another.

b. mySrc contains the Src object that corresponds to the SrcData object.

c. myRange points to the SrcRange object for mySrc, where the object type, SrcRange, contains information about a range of source lines. Several different Src objects can all correspond to the same SrcRange object. The information includes a first and last index for the source range and a type to indicate whether the source range is a simple range or a compound inline range. If the range is a simple source range, the information includes the source file name, the object file name, and the first line number for the range. Otherwise, the range is a compound inline range and the information includes the source index for the call, the source index for a line of the inline function definition, and the inlined function identifier d. myLvl holds the last level in myData containing valid source information for mySrc. It can also be thought of as the number of inline levels.

e. myLastLvl and myNewLastLvl give the last level allocated in myData and myNewData, respectively.

The following operations are defined for an object of type SrcData:

a. construction of an SrcData from an Src object;
   b. destruction of an SrcData that deletes the LvlData arrays pointed to by myData and myNewData;
   c. an operation returning the lowest level where the details of a given Src object differ from the details in the SrcData object. The value −1 is returned if there are no differences. The SrcData object is adjusted to contain the details of the given Src;
   d. an operation returning the inlined function identifier for a given level;
   e. an operation returning the beginning line number for a given level;
   f. an accessor for the instance variable myLvl;
   g. an operation returning the object file name for a given level; and,
   h. an operation returning the source file name for a given level.

An example source program consisting of two source files, FILE1 and FILE2, is set forth below:

| LINE NO. | FILE1 |
|---|---|
| 1 | int f(int x) |
| 2 | {return 10 / x;} |

| LINE NO. | FILE2 |
|---|---|
| 1 | #include "FILE1" |
| 2 | int main ( ) |
| 3 | {int a, b; |
| 4 | a = f(10); |
| 5 | b = f(0); |
| 6 | return a + b;} |

EXAMPLE

Execution of the binary program resulting from compiling the files set forth in the EXAMPLE above with a C compiler is interrupted in function f in FILE 1 at line 2 when the machine instruction doing a divide operation tries to divide by zero. That is, the call history is (FILE1, line 2), (FILE2, line 5). The second source location in the call history is the place where the function f is called when it is interrupted.

In the EXAMPLE illustrated and explained above, if the function f is inlined, then there is no call instruction from which to determine a call history if the prior art multipass compiler is used. For call histories to be properly determined for inlined functions, the tables in the binary file must include portions of call histories in place of mere source locations. Using the present invention, the inlined divide operation for the first call on function f is mapped to the call history (FILE1, line 2), (FILE2, line 4), and the inlined divide operation for the second call is mapped to the call history (FILE1, line 2), (FILE2, line 5). Having call histories for inlined functions stored in the binary file allows a debugging tool or other diagnostic software to show complete call histories.

The tables below show the information mapping machine instructions to source locations that would be stored along with the machine instructions in a binary file for the EXAMPLE above. Actual machine instructions are not shown. The first column of each table describes in words what would actually be numerical offsets into the stream of machine instructions stored in the binary file.

When the Function f is not Inlined

TABLE I

| Index into machine instructions for: | Corresponding source locations |
|---|---|
| return 10 / x | FILE2 line 2 |
| Allocation of a and b | FILE1 line 3 |
| call f(10) and assignment to a | FILE1 line 4 |
| call f(0) and assignment to b | FILE1 line 5 |
| return a + b | FILE1 line 6 |

When the Function f is Inlined

TABLE II

| Index into machine instructions for: | Corresponding source locations |
|---|---|
| Allocation of a and b | FILE1 line 3 |
| 10 / 10 | FILE2 line 2, FILE1 line 4 |
| assignment to a | FILE1 line 4 |
| 10 / 0 | FILE2 line 2, FILE1 line 5 |
| assignment to b | FILE1 line 5 |
| return a + b | FILE1 line 6 |

Both tables allow a debugging tool or other diagnostic software to provide the same correct call history, using the call instruction in TABLE I, and the inlined call history in TABLE II.

Figure 2A:
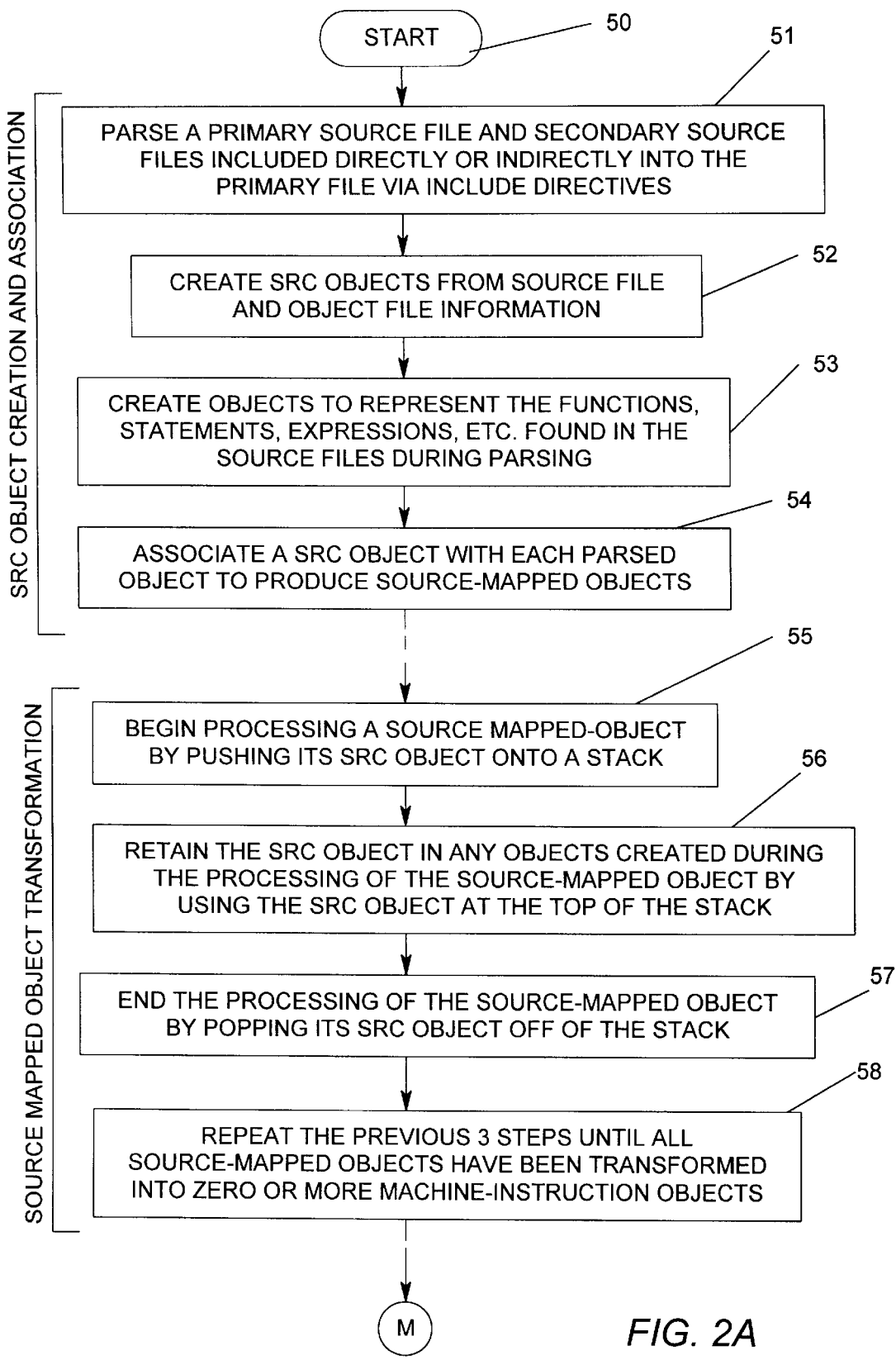
FIGS. 2A and 2B combined form a flow chart of the overall process of the present invention.
Figure 2B:
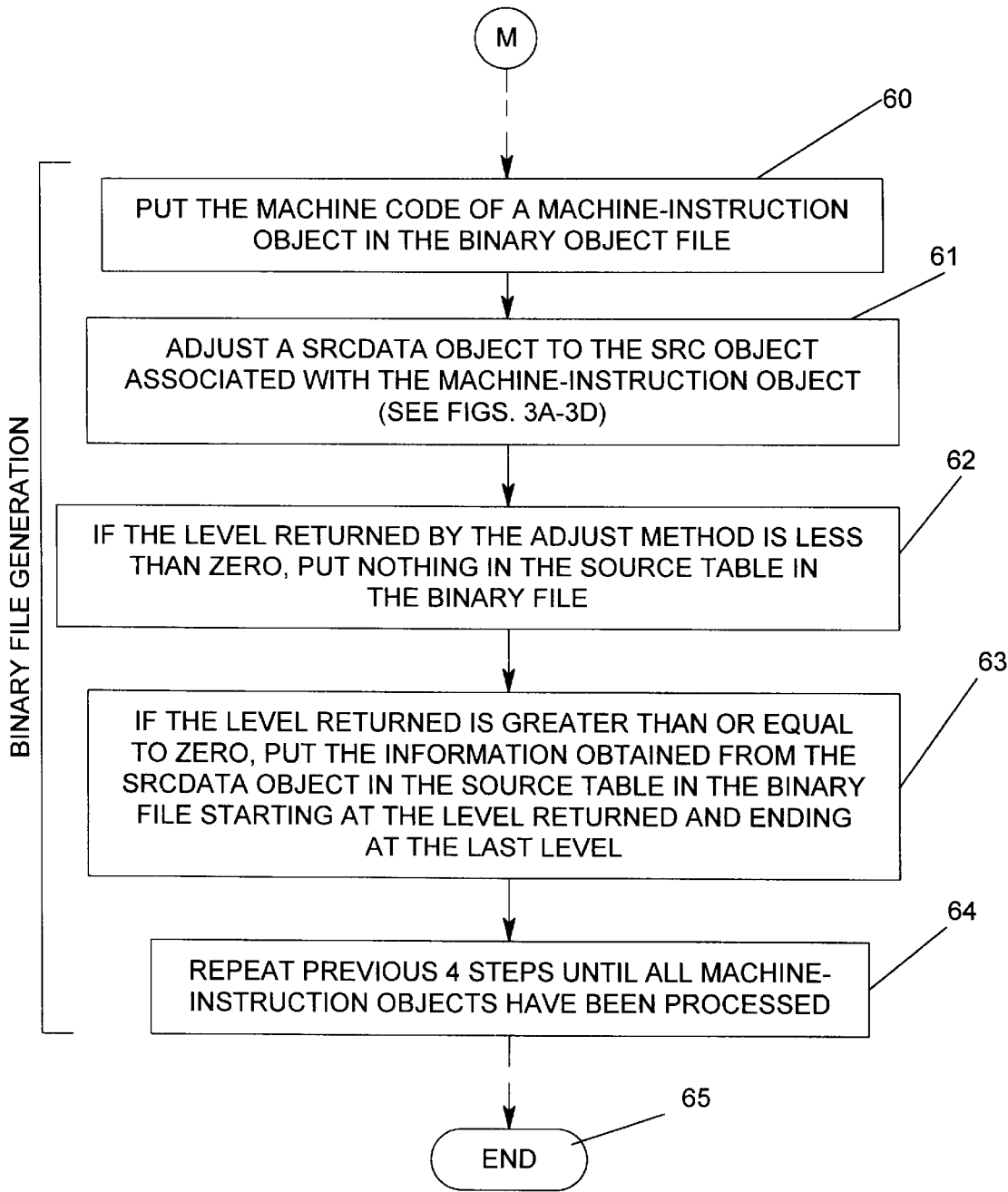

Referring now to FIGS. 2A and 2B, a flow chart of the overall process is illustrated. The first four steps shown in FIG. 2A create Src (source) objects and associate them with objects created to represent the information contained in the source files. The process begins with a start bubble 50 followed by a process step of parsing a primary source file and those secondary source files included directly or indirectly into the primary file via include directives (block 51). Next, Src objects are created from the source file name, position information and the object file name (block 52); and, objects are created to represent the functions, statements, expressions, etc. found in the source files during parsing (block 53). Following this, an Src object is associated with each parsed object to produce source-mapped objects (block 54).

The next four steps in FIG. 2A transform the source-mapped objects into machine-instruction objects while maintaining source information. First, as each source-mapped object is processed by the compiler, its Src object is pushed onto a stack (block 55). Next, objects created as a result of processing the source-mapped object acquire their Src object from the top of the stack (block 56). Following this, when processing of the source-mapped object ends, its Src object is popped off of the stack (block 57). The previous three steps are repeated until all source-mapped objects have been transformed into zero or more machine-instruction objects (block 58). The process illustration continues on the next sheet of the drawings (FIG. 2B) as denoted by a connector M.

Referring now to FIG. 2B at the connector M, the next five steps generate machine code and a table of source information in the binary file 36. The machine code of a machine instruction object is put into the binary object file 36 (block 60). Next, an SrcData object is adjusted (see FIGS. 3A–3D) to the Src object associated with the machine-instruction object (block 61). If the level returned as a result of adjusting the SrcData object to the Src object in the previous step is less than zero, nothing is put into the source table in the binary file (block 62). If the level returned is greater than or equal to zero, the information obtained from the SrcData object is put into the source table in the binary file starting at the level returned and ending at the last level (block 63). The previous 4 steps are repeated until all machine-instruction objects have been processed (block 64), following which the process ends (bubble 65).

Figure 3A:
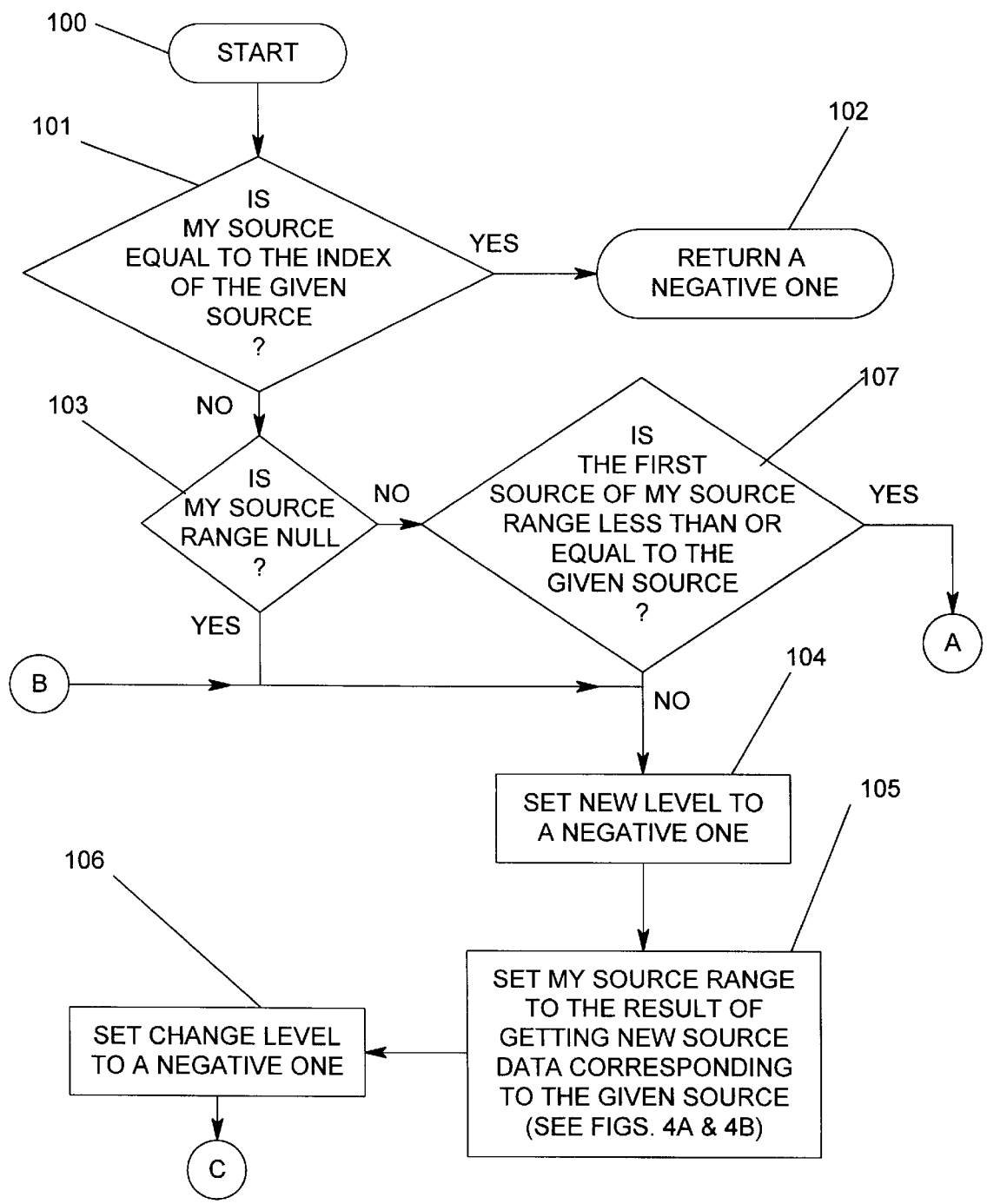
FIGS. 3A, through 3D combined form a flow chart of a process for adjusting a Source Data object to a given Source.

Referring now to FIG. 3A, which is the first sheet of a four-sheet flow chart, a process for adjusting a Source Data object to a given Source object is illustrated. The first few steps of the process determine whether the source received is different from what is currently in source data. The process begins with a start bubble 100 followed by an inquiry as to whether or not my source is equal to the given Source object (diamond 101). If the answer to this inquiry is yes, then a negative one is returned (bubble 102) On the other hand if the answer to this inquiry is no, then another inquiry is made as to whether or not my source range is null (diamond 103). If the answer to this inquiry is yes, then the new level is set to a negative one (block 104). Next, my source range is set to the result of getting new source data corresponding to the given Source object (block 105, see FIGS. 4A & 4B). Following this, the change level is set to a negative one (block 106). The process illustration is continued in FIG. 3B as denoted by a connector C.

Returning briefly to the diamond 103, it is necessary to determine whether the source received is in the same source range as the previous source. In particular, if my source range is not null, then another inquiry is made as to whether or not the first source of my source range is less than or equal to the given Source object (diamond 107). If the answer to this inquiry is no, then a branch is taken to the block 104 and the process continues as previously described. On the other hand, if the answer to the inquiry in the diamond 107 is yes, then a branch is taken to the next sheet of the drawings, FIG. 3B where the process illustration continues as denoted by a connector A.

Figure 3B:
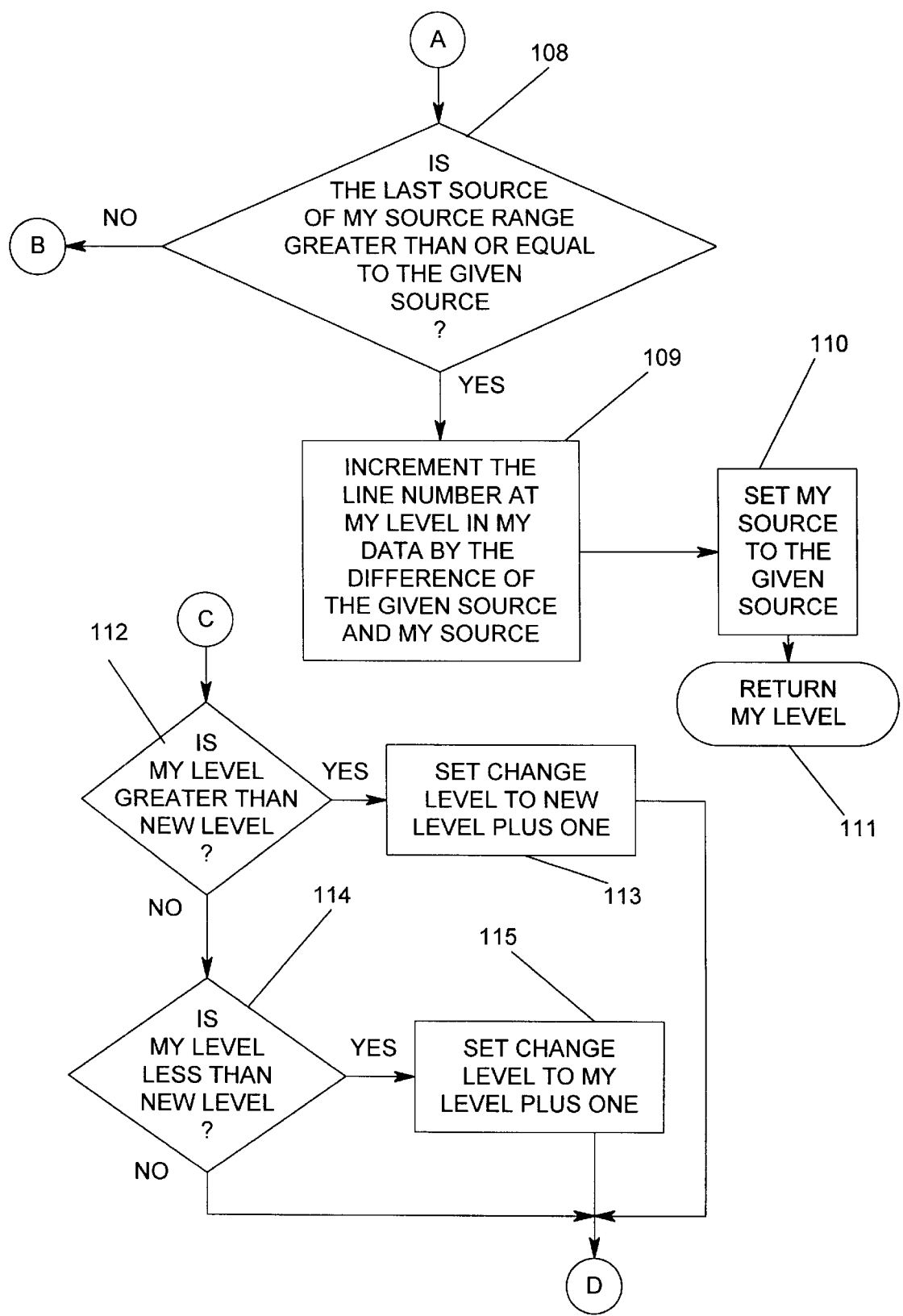

Referring now to FIG. 3B at the connector A, yet another inquiry is made as to whether or not the last source of my source range is greater than or equal to the given source (diamond 108). If the answer to this inquiry is no, then a branch is taken back to the block 104, which is shown in FIG. 3A, as denoted by a connector B.

If the answer to the inquiry in the diamond 108 is yes, then the line number at my level in my data is incremented by the difference of the given Source object and my source (block 109). At this point in the process, it has been determined that source data for the given Source object and this Source Data object match except possibly for the line number in the highest level of the data which was corrected in block 109. Next, my source is set to the given Source object (block 110), and my level is returned (bubble 111).

With reference to the connector C, an inquiry is made as to whether or not my level is greater than new level (diamond 112). If the answer to this inquiry is yes, then change level is set to new level plus one (block 113). On the other hand, if the answer to the inquiry in the diamond 112 is no, then another inquiry is made as to whether or not my level is less than new level (diamond 114). If the answer to this inquiry is yes, then change level is set to my level plus one (block 115). Upon completion of either the step depicted by the block 113 or the block 115, or if the answer to the inquiry in the diamond 114 is no, then a branch is taken to FIG. 3C of the drawings as denoted by a connector D.

Figure 3C:
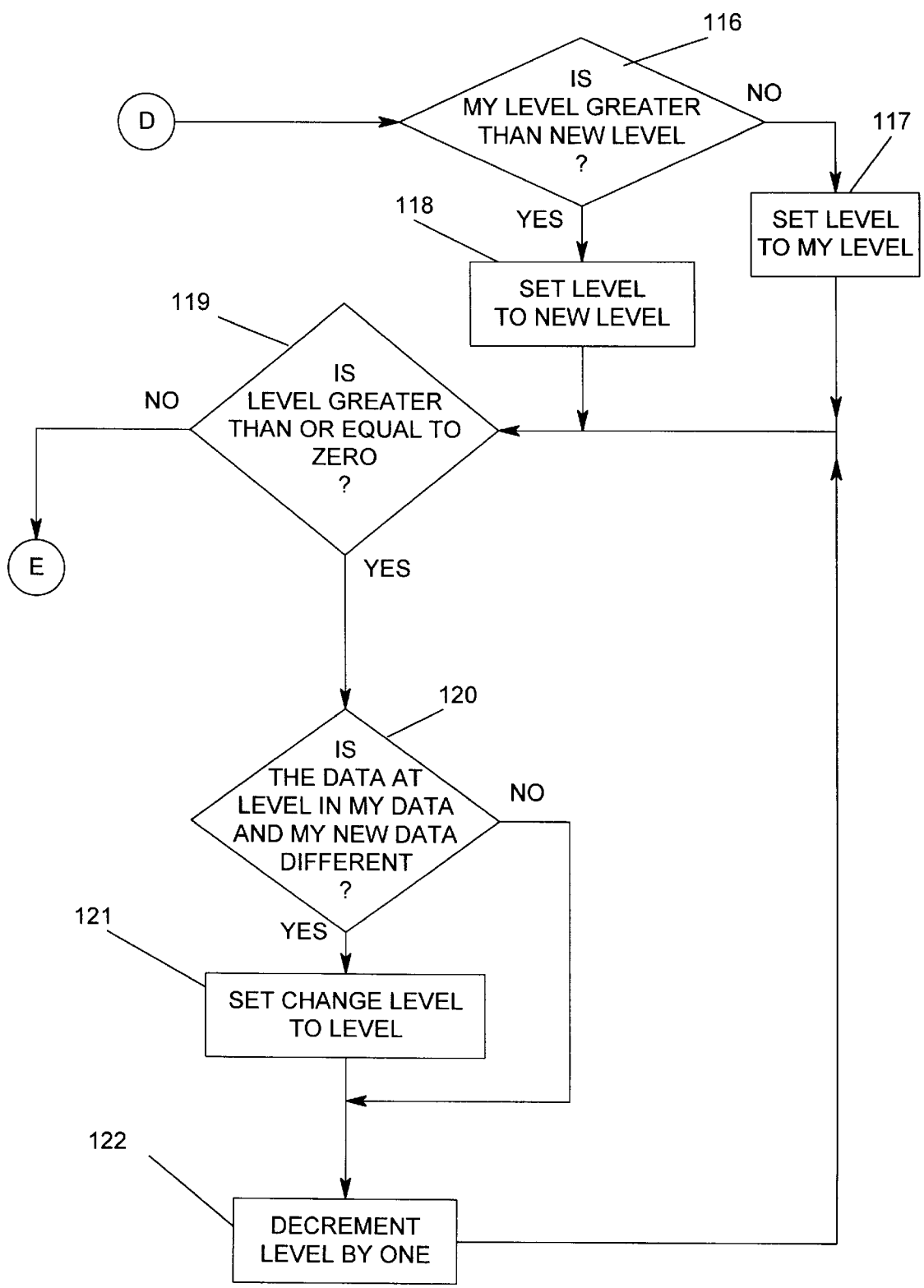

Referring now to FIG. 3C at the connector D, yet another inquiry is made as to whether or not my level is greater than new level (diamond 116). If the answer to the inquiry in the diamond 116 is no, then level is set to my level (block 117); and, if the answer to this inquiry is yes, then level is set to new level (block 118). Upon completion of either the step depicted by the block 117 or 118 it is necessary to perform a comparison of the old and new source data. An inquiry is thus made as to whether or not level is greater than or equal to zero (diamond 119). If the answer to this inquiry is yes, then still another inquiry is made as to whether or not the data at level is in my data and my new data is different (diamond 120). If the answer to this inquiry is yes, then change level is set to level (block 121).

Upon completion of the step depicted by the block 121, or if the answer to the inquiry in the diamond 120 is no, then the level is decremented by one (block 122). Next, a branch is made back to the diamond 119. The loop that begins at diamond 119 and ends at the block 122 compares the source data of the given Source object with this Source data object beginning at the highest level and continues downward until a level is found where they both contain the same data. If the answer to the inquiry in the diamond 119 is no, then a branch is taken to FIG. 3D of the drawings as denoted by a connector E.

Figure 3D:
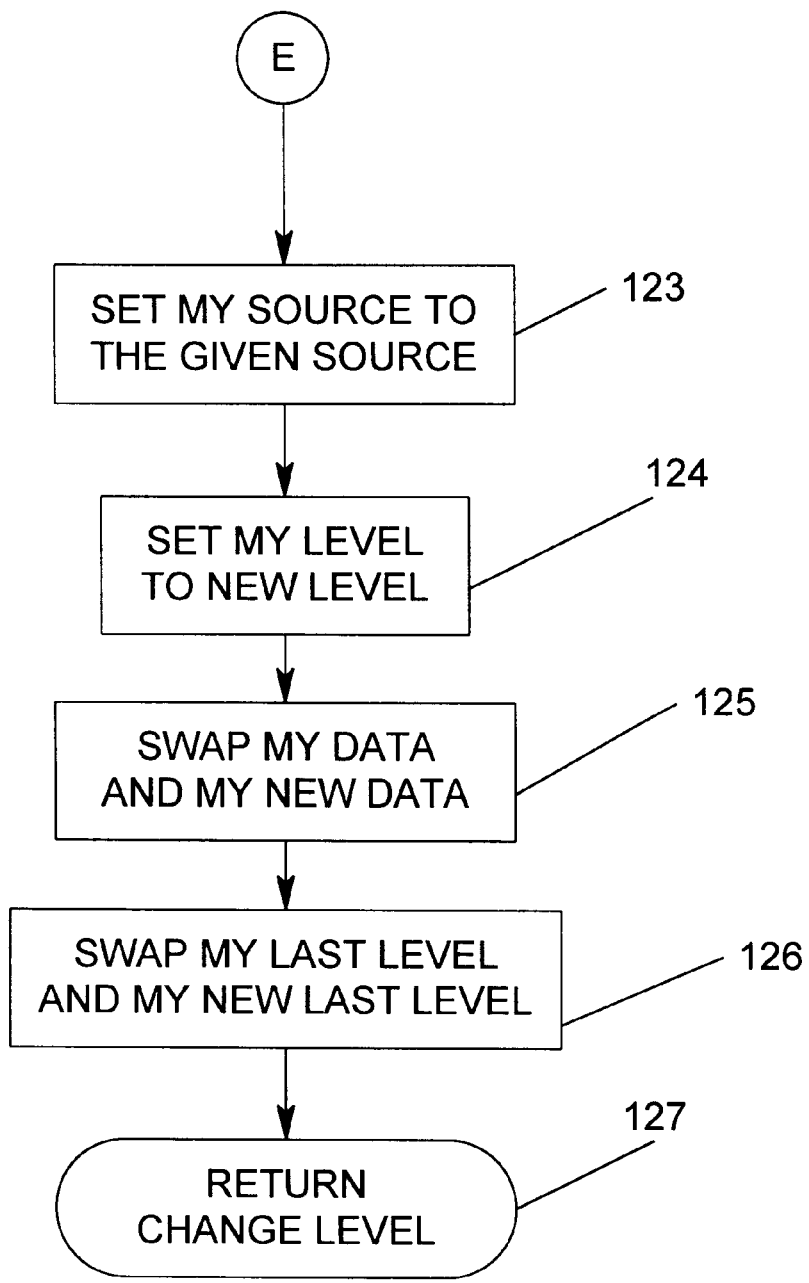

Referring now to FIG. 3D the source data is updated to reflect the new source. This part of the process begins at the connector E where my source is set to the given Source object (block 123). Next, my level is set to new level (block 124) and my data and my new data is swapped (block 125). Following this, my last level and my new last level is swapped (block 126). Finally, change level is returned (bubble 127). After determining the level at which the two sets of source data differ, this Source Data object has now been adjusted to reflect the source data corresponding to the given Source object.

Figure 4A:
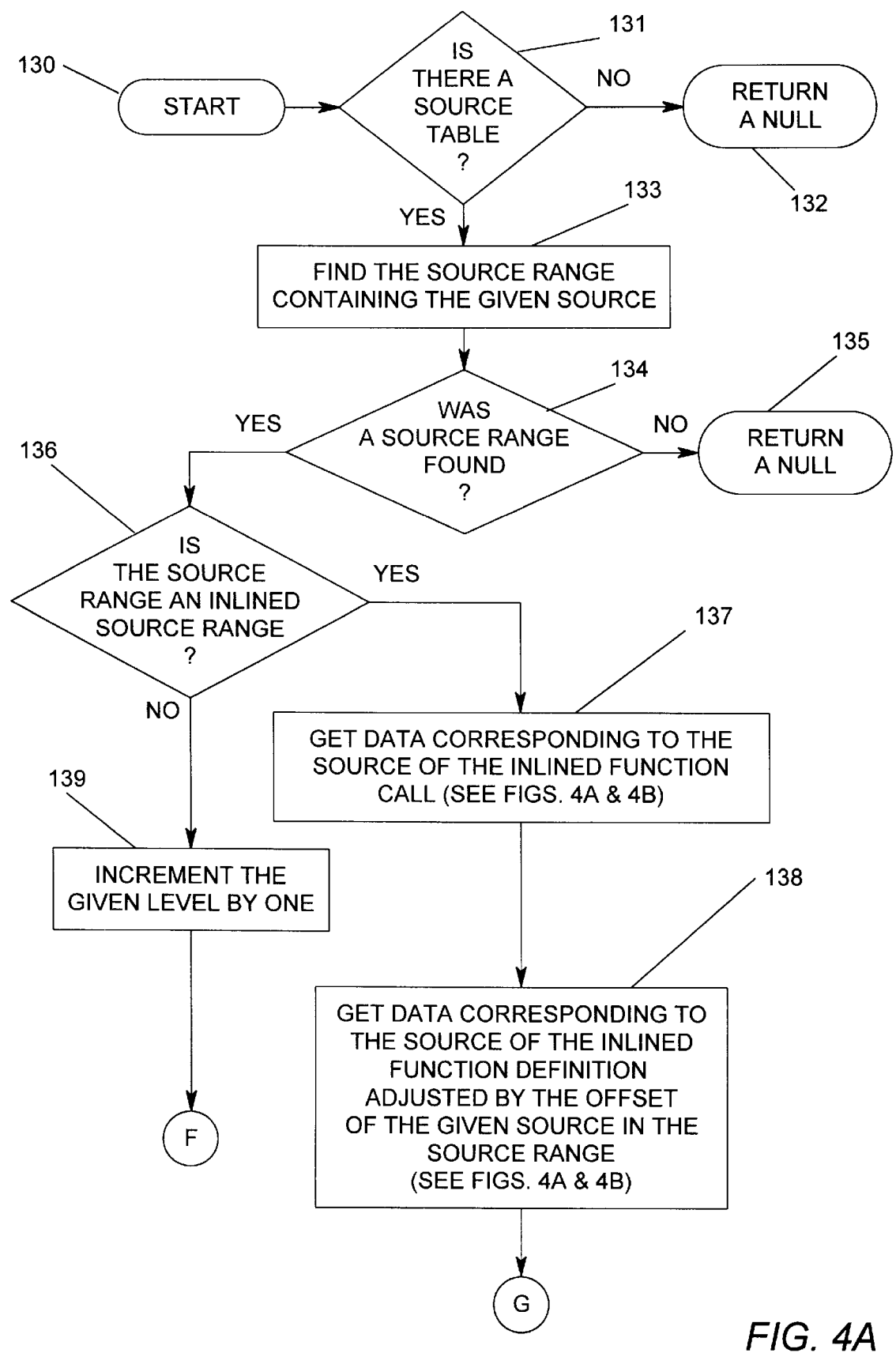
FIGS. 4A and 4B combined form a flow chart of a process for obtaining data about a Source object from a Source Data object.
Figure 4B:
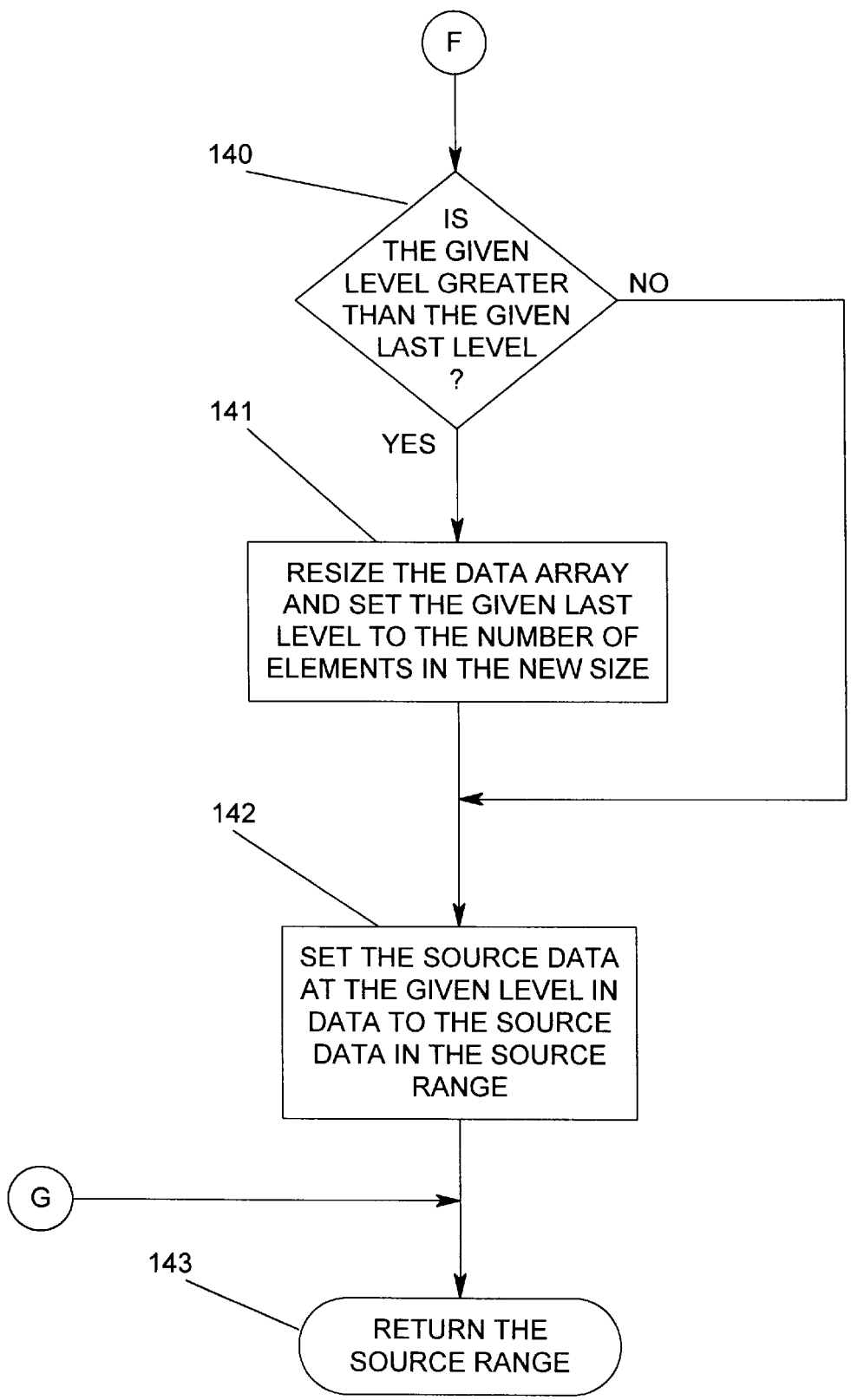

Referring now to FIGS. 4A and 4B, a flow chart of a process for obtaining data about a Source object from a Source Data object is illustrated. The process begins with an attempt to find the new source range in the source table starting with a bubble 130 followed by an inquiry as to whether or not a source table has been created (diamond 131). If the answer to this inquiry is no, then a null is returned (bubble 132). On the other hand, if the answer to this inquiry is yes, then a source range containing the given Source object is searched for in the source table (block 133). Next, another inquiry is made as to whether or not the source range referred to in the block 133 was found (diamond 134). If the answer to this inquiry is no, then a null is returned (bubble 135). On the other hand if the answer to this inquiry is yes, then still another inquiry is made as to whether or not the source range is an inlined source range (diamond 136).

If the answer to this inquiry is yes, then data corresponding to the Source object of the inlined function call is retrieved from the source table (block 137, see FIGS. 4A & 4B). It is pointed out that the block 137 depicts a reexecution of the entire process shown in FIGS. 4A & 4B. Next, the data corresponding to the Source object of the inlined function definition adjusted by the offset of the given Source object in the source range is also retrieved from the source table (block 138, see FIGS. 4A & 4B). This leg of the process continues in FIG. 4B as denoted by a connector G. If the answer to the inquiry in the diamond 136 is no, then the given level is incremented by one (block 139). This leg of the process illustration is continued in FIG. 4B as denoted by a connector F.

Referring now to FIG. 4B at the connector F, an inquiry is made as to whether or not the given level is greater than the given last level (diamond 140). If the answer to this inquiry is yes, then the data array contained within source data is resized and the given last level is set to the number of elements in the new size (block 141). Following this, the source data at the given level in data is set to the source data in the source range (block 142). If the answer to the inquiry in the diamond 140 is no, then a branch is taken directly to the block 142 thereby skipping the step depicted by the block 141. On completion of the step depicted by the block 142, the source range is returned (bubble 143). Note that the connector G from the block 138 in FIG. 4A connects with the bubble 143.

The methods described above illustrate how an SrcData object identifies changes in source location details. As the compiler goes through the sequence of machine instruction objects in order to put machine instruction codes into the binary file, it uses an SrcData to determine when call histories have changed and at what level they have changed. The compiler is thereby able to record only those changes in a table in the binary file, keeping the table size to a minimum while providing all the information needed for debugging tools to show complete call histories. The pseudo code for the present invention is set forth in SECTION I hereinbelow.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

---

SECTION I

Adjusting a Source Data object to a given Source object, FIGS. 3A through 3D a) is my source equal to the given source?
   Yes:  a) return negative one
   No:
b) is my source range null?
   Yes:
   No:     a)  is the first source of my source range less than or equal to the given source?
                Yes:  a)  is the last source of my source range greater than or equal to the given source?
                              Yes:  a)  increment the line number at my level in my data by the difference of the given source and my source
                                        b)  set my source to the given source
                                        c)  return my level
                              No:
                No:
c) set new Level to negative one
d) set my source range to the result of getting new source data corresponding to the given source (see FIGS. 4A & 4B)
e) set change level to negative one
f) is my level greater than new level?
   Yes:     a)  set change level to new level plus one
   No:      a)  is my level less than new level
               Yes:  a) set change level to my level plus one
               No:
g) is my level greater than new level?
   Yes:    a) set level to new level
   No:     a) set level to my level
h) is level greater than or equal to zero?

-continued

SECTION I

```
Yes:    a)  is the data at level in my data and my new data different?
            Yes:    a) set change level to level
            No:
            b)  decrement level by one
            c)  go to h
No:
i)  set my source to the given source
j)  set my level to new level
k)  swap my data and my new data
l)  swap my last level and my new last level
m)  return change level
```

Getting data for a Source object from a Source Data object, FIGS. 4A and 4B

```
a)  is there a source table?
    Yes:    a) find the source range containing the given source
    No:     a) return null
b)  was a source range found?
    Yes:    a)  is the source range an inlined source range?
                Yes:    a)  get data corresponding to the source of the
                            inlined function call (see FIGS. 4A & 4B)
                        b)  get data corresponding to the source of the
                            inlined function definition adjusted by the
                            offset of the given source in the source range
                            (see FIGS. 4A & 4B)
                No:     a)  increment the given level by one
                        b)  is the given level greater than the given last
                            level?
                            Yes:    a)  resize the data array and set the given
                                        last level to the number of elements in
                                        the new size
                        c)  set the source data at the given level in data to
                            the source data in the source range
            b)  return the source range
    No:     a)  return null
```

What is claimed is:

1. In an object-oriented apparatus stored in the memory of a computer system a method for tracking changes in source locations in a compiler, said method comprising the steps of:

a. for each source language element parsed by said compiler, creating a source object and associating each such created source object with objects created from source language elements to produce source-mapped objects;

b. transforming each of said source-mapped objects into a corresponding machine-instruction object; and, c. generating a binary file of said machine-instruction objects by:

i) adjusting a source data object to a source object associated with a machine instruction object, thereby identifying a lowest level of inlining where the call history of said source object differs from the call history of an immediately previous source object to which said source data object was adjusted;

ii) if said source data object identifies no difference from said previous source object, then continuing at step i) for the next machine instruction object; and, iii) for each level of the call history beginning with the level returned in the preceding step and continuing through the last level, putting information obtained from said source data object in a source table stored in said binary file.

2. The method as in claim 1 further comprising the steps of:

d. determining if said source object is different from said previous source object to which said source data object was adjusted, and if different;

e. determining if said source object is within the same source range as said source data, and if the same object;

f. comparing said source object with said source data object; and, g. updating said source data object to reflect said source object.

3. The method as in claim 2 further comprising the steps of:

h. finding a new source range in a source table;

i. determining type of source range, ordinary or inlined, and where inlined;

j. repeating all steps hereof for each source object.

4. The method as in claim 3 further comprising the step of re-sizing a data array, if necessary, and setting given last level to number of elements in new size.

5. The method as in claim 4 further comprising the step of setting source details at a given level in said source data object to source details in source range and returning said source range.

6. The method as in claim 2 wherein step d thereof further comprises:

finding new source range in a source table for said source object;

determining if type of source range is inlined; and, where said source range is determined to be inlined, repeating the steps of d) through g) for source objects corresponding to a function call location and a function definition location of said source object.

* * * * *